March 26, 1963 K. GEISSBAUER 3,083,250
ELECTRODE PLATE FOR LEAD STORAGE BATTERIES
Filed Dec. 16, 1959 4 Sheets-Sheet 1
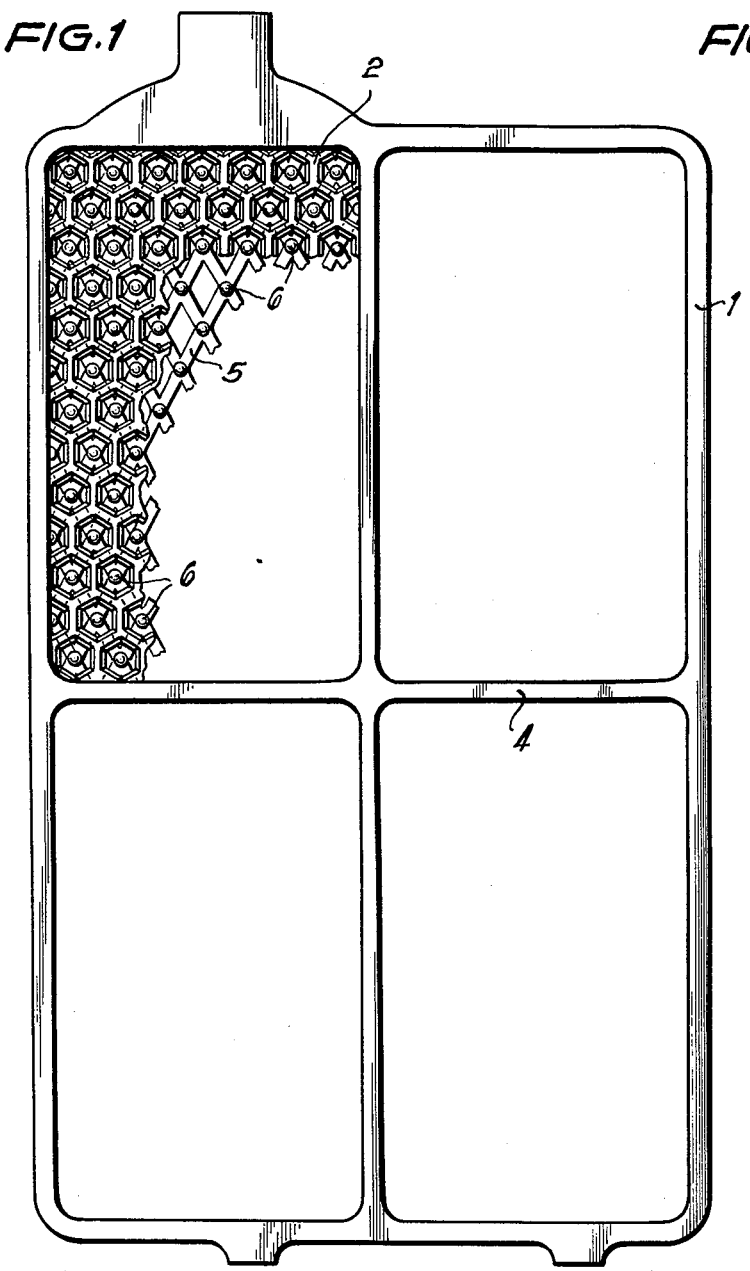
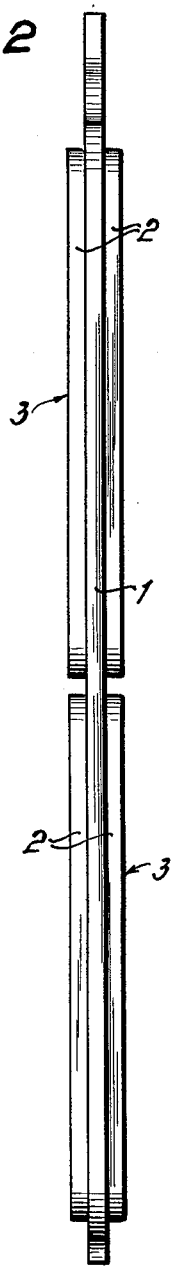
INVENTOR
Karl GEISSBAUER
by
Mestern & Kollin
ATTORNEYS March 26, 1963 K. GEISSBAUER 3,083,250
ELECTRODE PLATE FOR LEAD STORAGE BATTERIES
Filed Dec. 16, 1959 4 Sheets-Sheet 2
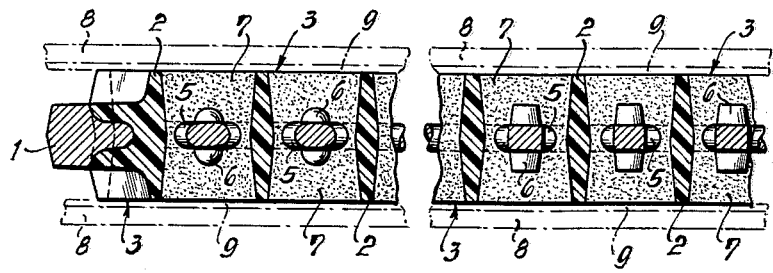
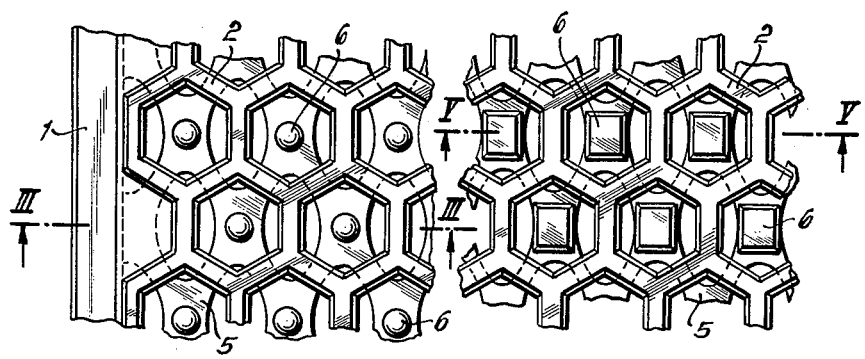
INVENTOR
Karl GEISSBAUER
by
Mestern & Kollin
ATTORNEYS March 26, 1963 K. GEISSBAUER 3,083,250
ELECTRODE PLATE FOR LEAD STORAGE BATTERIES
Filed Dec. 16, 1959 4 Sheets-Sheet 3

INVENTOR
Karl GEISSBAUER
by
Mestern & Kollin
ATTORNEYS

March 26, 1963  K. GEISSBAUER  3,083,250
ELECTRODE PLATE FOR LEAD STORAGE BATTERIES
Filed Dec. 16, 1959  4 Sheets-Sheet 4

INVENTOR
Karl GEISSBAUER
by
Mestern & Kollin
ATTORNEYS 3,083,250
ELECTRODE PLATE FOR LEAD STORAGE
BATTERIES
Karl Geissbauer, Paul Lagarde-Strasse 20,
Munich, Germany
Filed Dec. 16, 1959, Ser. No. 859,932
Claims priority, application Austria July 28, 1959
3 Claims. (Cl. 136—38)

The present invention relates to an electrode plate for lead storage batteries having a lead grid comprising a frame with diagonal, vertical or horizontal members.

Such grid plates are known per se. They are found to have the disadvantage, however, of being unsuited for delivering high currents over short periods, because they have too little surface area. In known starter batteries, this disadvantage is avoided by making the plates very thin. But it is found in turn that such enlargement of effective plate area is gained at the expense of battery life, because too little active compound is contained.

For use in diesel locomotives and self-propelled cars, therefore, so-called oversize starter batteries are common. These batteries have ordinary grid plates such as are installed in electric motor vehicle, but reinforced terminals for carrying larger currents. In addition to the capacitive load of compressors, lighting circuits etc., these batteries are supposed to be able to deliver high starting currents for turning over heavy diesel engines. To achieve such starting currents, the batteries must be oversize, because the active surface is comparatively small. All in all, these batteries are very heavy, expensive and bulky.

In another known grid construction, a lead frame is fitted with supports for the active compound in the form of tiny tubes of microporous synthetic material, or spun glass cemented with microporous synthetic material. While this construction surpasses the aforementioned in capacity, it is very difficult to execute, and hence very expensive. Another disadvantage is that the members of the grid, exposed to the acid particularly at the points of connection to the frame, corrode quickly, thus shortening the life of the plates.

The object of the present invention, then, was to devise an electrode plate avoiding the disadvantages of previously known grid plates as described, and distinguished by large surface area, light weight and long life.

According to the invention, this object is achieved in that, upon one or both sides of the diagonal grid, respectively one or two grids of synthetic material are pressed, having regularly arrayed perforations of circular or regular polygonal shape, in which the active compound is contained.

In futher elaboration of the idea of the invention, the grids of synthetic material are so consolidated at the points adjacent to the points of junction of the lead grid to the frame and its members that the synthetic material has no microporosity at these points, and so that these especially corrosion-sensitive parts of the lead grid do not come into contact with the acid.

Another advantageous embodiment of the grid plates according to the invention has perforations of different shape in the electrode plate intended to accommodate positive active compound from those in the electrode plate intended to accommodate negative active compound. For example, the perforations of the positive plate may be circular and those of the negative plate may have the form of regular hexagons.

The device according to the invention will now be more fully described with reference to the accompanying drawings, but it should be understood that these are given by way of illustration and not of limitation and that many changes may be made in the details without departing from the spirit of the invention.

In the drawings,

FIG. 1 shows a view of a plate with frame 1 of hard lead, grid 2 of synthetic material, cross members 4 and diagonal grid 5.

FIG. 2 shows an edge view of the plate of FIG. 1.

FIG. 3 shows an enlarged sectional view of the plate, taken at A—B in FIG. 4.

FIG. 4 shows an enlarged view of a portion of FIG. 1.

FIG. 5 shows an enlarged sectional view of a modified embodiment, taken at A—B in FIG. 6.

FIG. 6 shows an enlarged view of a portion of the same modified embodiment.

Figure 7:
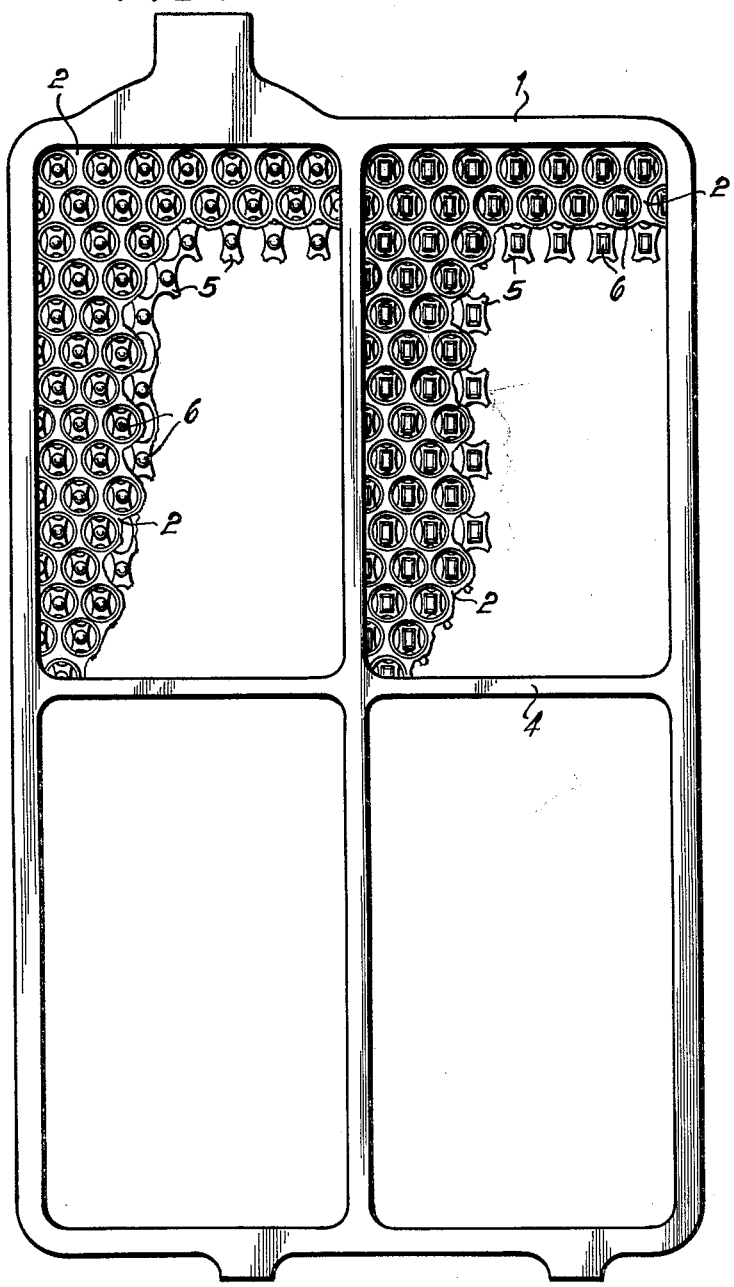

FIG. 7 shows a view of another plate with frame 1 of hard lead, grid 2 of synthetic material, cross members 4 and diagonal grid 5.

Figure 8:
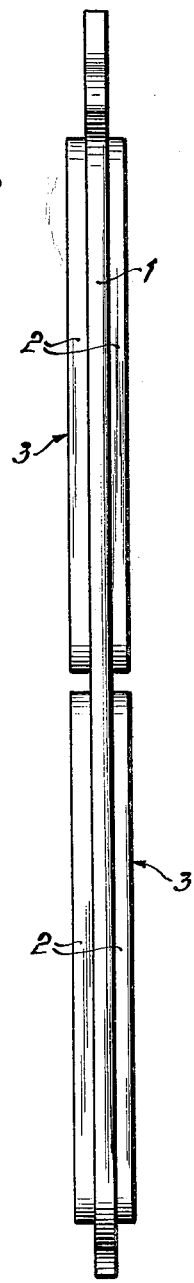

FIG. 8 shows an edge view of the plate of FIG. 7.

Figures 9, 11:
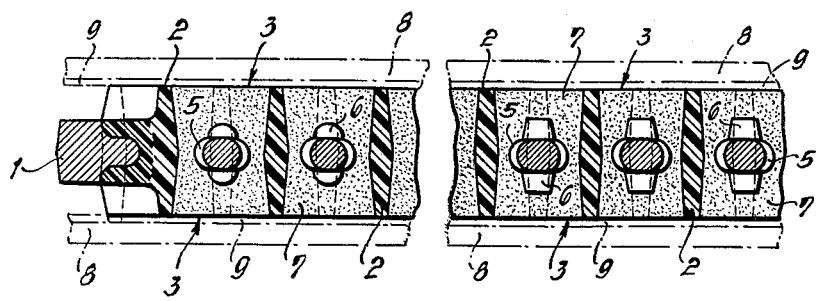
Figures 10, 12:
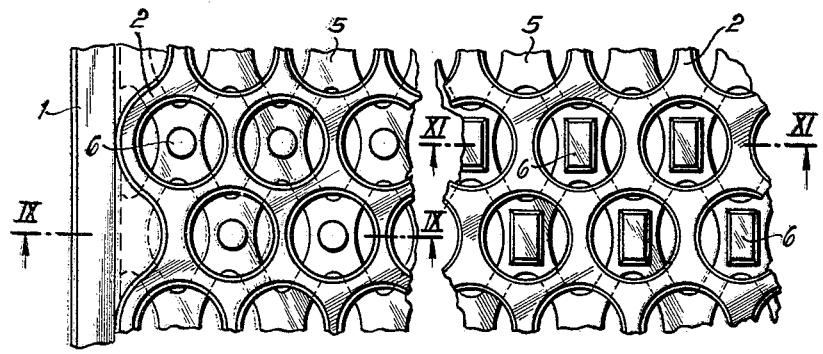

FIG. 9 shows an enlarged sectional view of the same plate, taken at A—B in FIG. 10.

FIG. 10 shows an enlarged view of a portion of FIG. 7.

FIG. 11 shows an enlarged view of another modified embodiment, taken at A—B in FIG. 12.

FIG. 12 shows an enlarged view of a portion of the same modified embodiment.

The negative plate is decked over with otherwise known microporous flat or corrugated dividers 8 (FIG. 11). All perforations (on faces 3) of the positive plate (FIGS. 1, 2, 3, 5) are closed over with a thin glass wool or fabric divider 9 (FIG. 3) pressed over the entire area of the plate. Thus the compound cannot drop out, but can expand in service. To enlarge the surface of contact between active compound 7 (FIGS. 3, 9, 11), bosses 6 are added at the intersections of the diagonal grid 5.

What I claim is:

1. An electrode plate for lead storage batteries having a lead grid, which comprises, in combination, a frame; said lead grid disposed within said frame and fastened thereto at a plurality of points of junction; a second grid of a synthetic material pressed onto at least one side of said lead grid, said second grid being microporous except adjacent to said points of junction where no porosity is present, and having regularly arrayed perforations; and active positive compound disposed in said perforations.

2. An electrode plate for lead storage batteries having a lead grid, which comprises, in combination, a frame; said lead grid disposed within said frame and fastened thereto at a plurality of points of junction; a second grid of a synthetic material pressed onto at least one side of said lead grid, said second grid being microporous except adjacent to said points of junction where no porosity is present, and having regularly arrayed perforations; and active negative compound disposed in said perforations.

3. In a storage battery having a first and a second electrode plate, each of different polarity and each in a frame and having a lead grid disposed therein, the improvement which comprises said lead grids being fastened to said frames at a plurality of points of junction; both said electrode plates having second grids fastened to the frames at a plurality of points of junction; said second grids being of a synthetic material which is microporous except adjacent to said points of junction; each of said grids of synthetic material having regularly arrayed perforations but of two different configurations; positive active compound being disposed in the perforations of one of said configurations; and negative active compound being disposed in the perforations of said second configuration.

References Cited in the file of this patent

UNITED STATES PATENTS

| | | |
|---|---|---|
| 341,600 | Pitkin | May 11, 1886 |
| 425,957 | Philippart | Apr. 15, 1890 |
| 773,961 | Morgan | Nov. 1, 1904 |
| 904,645 | Post et al. | Nov. 24, 1908 |
| 2,247,161 | Wells | June 24, 1941 |
| 2,317,759 | Haebler | Apr. 27, 1943 |
| 2,724,733 | Hagspihl et al. | Nov. 22, 1955 |

FOREIGN PATENTS

| | | |
|---|---|---|
| 719,598 | Great Britain | Dec. 1, 1954 |
| 18,796 | Great Britain | of 1897 |
| 421,947 | France | Jan. 7, 1911 |
| 167,977 | Australia | July 24, 1956 |